US009401887B2

(12) United States Patent
Albouyeh et al.

(10) Patent No.: US 9,401,887 B2
(45) Date of Patent: *Jul. 26, 2016

(54) IDENTIFYING CONTENT IN AN INCOMING MESSAGE ON A SOCIAL NETWORK

(71) Applicant: International Business Machines Corporation, Armonk, NY (US)

(72) Inventors: Shadi E. Albouyeh, Raleigh, NC (US); Bernadette A. Carter, Raleigh, NC (US); Jeffrey R. Hoy, Southern Pines, NC (US); Stephanie L. Trunzo, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 13/959,622

(22) Filed: Aug. 5, 2013

(65) Prior Publication Data
US 2015/0039701 A1 Feb. 5, 2015

Related U.S. Application Data

(63) Continuation of application No. 13/955,293, filed on Jul. 31, 2013.

(51) Int. Cl.
*G06F 15/16* (2006.01)
*H04L 12/58* (2006.01)

(52) U.S. Cl.
CPC .................... *H04L 51/32* (2013.01)

(58) Field of Classification Search
CPC ......... H04L 51/32; H04L 51/36; H04L 51/12; H04L 67/22; H04L 12/585; H04L 12/1813; H04L 63/0227
See application file for complete search history.

(56) References Cited

U.S. PATENT DOCUMENTS

| | | | |
|---|---|---|---|
| 7,185,065 B1* | 2/2007 | Holtzman | G06F 17/2745 705/36 R |
| 8,041,589 B1 | 10/2011 | Blair et al. | |
| 8,095,613 B1 | 1/2012 | Perkowitz et al. | |
| 8,145,474 B1* | 3/2012 | Daily et al. | 704/9 |
| 2004/0225640 A1* | 11/2004 | Brown | G06Q 10/107 707/999.003 |
| 2008/0126310 A1* | 5/2008 | Xu | G06Q 10/10 707/999.003 |
| 2009/0055484 A1* | 2/2009 | Vuong | G06Q 10/107 709/206 |
| 2010/0030755 A1* | 2/2010 | Kim | 707/3 |
| 2010/0115037 A1* | 5/2010 | Hull et al. | 709/206 |
| 2011/0179385 A1* | 7/2011 | Li | G06F 17/3082 715/810 |
| 2011/0191417 A1* | 8/2011 | Rathod | 709/204 |
| 2012/0185544 A1* | 7/2012 | Chang | G06Q 50/01 709/206 |
| 2012/0278164 A1 | 11/2012 | Spivack et al. | |
| 2013/0170813 A1* | 7/2013 | Woods | H04N 5/765 386/200 |
| 2013/0179422 A1* | 7/2013 | Raju | 707/706 |
| 2013/0179802 A1* | 7/2013 | Martinazzi | H04L 67/22 715/753 |
| 2013/0218871 A1* | 8/2013 | McConnell et al. | 707/722 |
| 2013/0297317 A1* | 11/2013 | Lee et al. | 704/270.1 |
| 2013/0346515 A1* | 12/2013 | DeLuca | G06Q 50/01 709/206 |
| 2014/0025692 A1* | 1/2014 | Pappas | G06F 17/30867 707/754 |
| 2014/0032358 A1* | 1/2014 | Perkowitz et al. | 705/26.7 |
| 2014/0082094 A1* | 3/2014 | Bilgen et al. | 709/206 |
| 2014/0218391 A1* | 8/2014 | McConnell et al. | 345/619 |
| 2014/0344709 A1* | 11/2014 | Roberts et al. | 715/752 |
| 2015/0039701 A1* | 2/2015 | Albouyeh et al. | 709/206 |
| 2015/0253850 A1* | 9/2015 | Behles | G06F 3/0488 715/702 |

* cited by examiner

*Primary Examiner* — Oanh Duong
(74) *Attorney, Agent, or Firm* — Steven L. Nichols; Fabian VanCott

(57) ABSTRACT

Identifying content in an incoming message on a social network includes categorizing a sender-recipient relationship between a sender and a recipient of an incoming message in an activity stream in a display.

5 Claims, 5 Drawing Sheets

IDENTIFYING CONTENT IN AN INCOMING MESSAGE ON A SOCIAL NETWORK

RELATED APPLICATION

The present specification is a continuation, and claims the priority under 35 U.S.C. §120, of previous U.S. patent application Ser. No. 13/955,293, entitled "Identifying Content in an Incoming Message on a Social Network," filed Jul. 31, 2013, which application is incorporated herein by reference in its entirety.

BACKGROUND

The present invention relates to identifying content in an incoming message on a social network, and more specifically, to identifying content in an incoming message for an activity stream on a social network.

A social network is a web based application to enable a user to establish connections with other users such as friends, family, and colleagues in an online environment. Once a user is connected to other users, the users may share information with each other on the social network by uploading pictures, updating personal information, commenting on other users' information, and other activities. A social network uses an activity stream to display the information shared between the users. An activity stream allows a user to be aware of collaborative actions by other users. Thus, a user's activity stream displays shared information from other users.

BRIEF SUMMARY

A method for identifying content in an incoming message on a social network includes categorizing a sender-recipient relationship between a sender and a recipient of an incoming message in an activity stream in a display.

A method for identifying content in an incoming message on a social network includes categorizing a sender-recipient relationship between a sender and a recipient of an incoming message in an activity stream in a display, categorizing a content of the incoming message, determining a degree of a sender attitude of the incoming message, and generating a recommendation based on the incoming message.

A method for identifying content in an incoming message on a social network includes categorizing a sender-recipient relationship between a sender and a recipient of an incoming message in an activity stream in a display, categorizing a content of the incoming message, and generating a recommendation based on the incoming message.

A computer program product includes a computer readable storage medium, the computer readable storage medium having computer readable program code embodied therewith. The computer readable program code having computer readable program code to categorize a sender-recipient relationship between a sender and a recipient of an incoming message in an activity stream in a display.

A system for identifying content in an incoming message on a social network includes a relationship categorization engine to categorize a sender-recipient relationship between a sender and a recipient of an incoming message in an activity stream in a display, a content categorization engine to categorize a content of the incoming message, a determination engine to determine a degree of a sender attitude towards the incoming message, and a generation engine to generate a recipient recommendation based on the incoming message.

A system for identifying content in an incoming message on a social network includes a relationship categorization engine to categorize a sender-recipient relationship between a sender and a recipient of an incoming message in an activity stream in a display, a content categorization engine to categorize a content of the incoming message, and a generation engine to generate a recommendation based on the incoming message.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
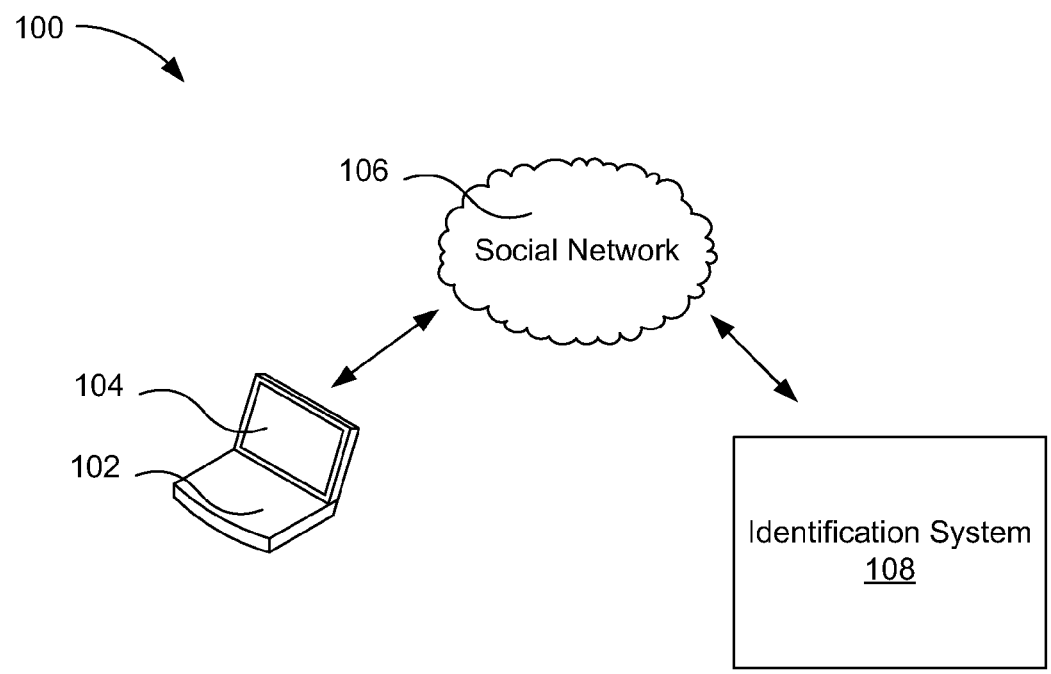
FIG. 1 is a diagram of an example of a system for identifying content in an incoming message on a social network, according to one example of principles described herein.

The present specification describes a method and system for identifying content in an incoming message on a social network such that a recommendation based on the incoming message is generated to allow the recipient to pursue counter measures to counteract the impact of the incoming message.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

Although a traditional social network enables a recipient to establish connections with others such as friends, family, and colleagues in an online environment, each connection with others are of equal importance. As a result, information shared in the activity stream on the social network between users is displayed in the order the information is uploaded to the social network. Further, a recipient has few options to filter information shared on the activity stream. As a result, the recipient may not be aware of collaborative actions or important information shared on the activity stream. Further, if the recipient is not aware of collaborative actions or important information shared on the activity stream, the recipient may not pursue counter measures to counteract the content of the incoming message. By merely listing all the messages in the activity stream based on a chronological order, the messages of most interest to the user may get buried and overlooked.

The principles described herein include a method and a system for identifying content in an incoming message on a social network. Such a method and system includes categorizing a sender-recipient relationship of an incoming message in an activity stream in a display. Such a method allows a recipient to categorize a number of relationships with senders. As a result, the recipient may filter information shared in the activity stream on the social network based on the sender-recipient relationship. This allows the recipient to be aware of collaborative actions or important information shared on the activity stream.

The sender may be a sender who directly sends a message to the recipient. For example, the sender may send an email message addressed to the recipient. In other examples, the sender may indirectly send the incoming message to the recipient. For example, the sender may update the sender's social network profile, and the social networking profile may send a message to the sender's network that informs the members of the sender's network about the update. In other examples, the sender can indirectly send incoming messages to the recipient when the sender makes an announcement and another entity sends the announcement to the recipient. For example, the sender may make a press release, post a blog entry, make an announcement on a social networking platform, and in response, another entity sends an incoming message to the recipient. In yet other examples, the recipient and the sender may be part of a common organization, such as a society dedicated to the promotion of their profession. In such an example, the sender can indirectly send the recipient an incoming message by doing something noteworthy that the professional organization mentions in an electronic message to the other members of the professional organization. In a further example, the sender can indirectly send the recipient a message by doing something noteworthy in the community, and a news feed sends the recipient an incoming message that contains content about the sender.

Further, the method can include generating a recommendation based on the incoming message. As will be described below, a recommendation allows a recipient to pursue counter measures to counteract the impact of the incoming message. The recommendation will be described in more detail below.

The present specification also describes a computer program product for identifying content in an incoming message on a social network that includes computer-readable instructions on a tangible medium, that, when executed by a processor, cause a list of incoming messages to be displayed in a recipient's activity stream.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for identifying content in an incoming message on a social network, according to one example of principles described herein. As will be described below, an identification system is in communication with a social network to identify content in an incoming message on a social network. Further, the identification system generates a recommendation to allow a recipient to pursue counter measures to counteract the content of the incoming message.

In one example, the system (100) includes a user device (102) with a display (104). In this example, a recipient uses the user device (102) to access a social network (106). Further, once a recipient is connected to the social network (106), a recipient may establish connections with others such as friends, family, and colleagues in an online environment. As mentioned above, the social network (106) uses an activity stream to display information shared between users. As a result, an activity stream allows a recipient to be aware of collaborative actions taken by others. In this example, the display (104) displays an activity stream from the social network (106). More details about the activity stream will be described below.

Further, the system (100) includes an identification system (108). In one example, the identification system (108) is in communication with a social network (106) to identify content in an incoming message on the social network (106). The identification system (108) categorizes a sender-recipient relationship of an incoming message in an activity stream in a display. The identification system (108) then categorizes a content of the incoming message and determines a degree of sender attitude towards the incoming message. Further, the identification system (108) generates a recipient recommendation based on the incoming message. As a result, the identification system (108) generates a recommendation to allow the recipient to pursue counter measures to counteract the impact of the incoming message. More information about the identification system (108) will be described below.

While this example has been described with reference to the identification system being located over the network, the identification system may be located in any appropriate location according to the principles described herein. For example, the identification system may be located in a user device. Further, in one example, an identification system (108) is used to filter information displayed in the activity stream. For example, the identification system (108) can display just incoming messages in an activity stream that allows the recipient to pursue counter measures to counteract the impact of the incoming message. In another example, the identification system (108) displays all incoming messages in the activity stream.

Figure 2:
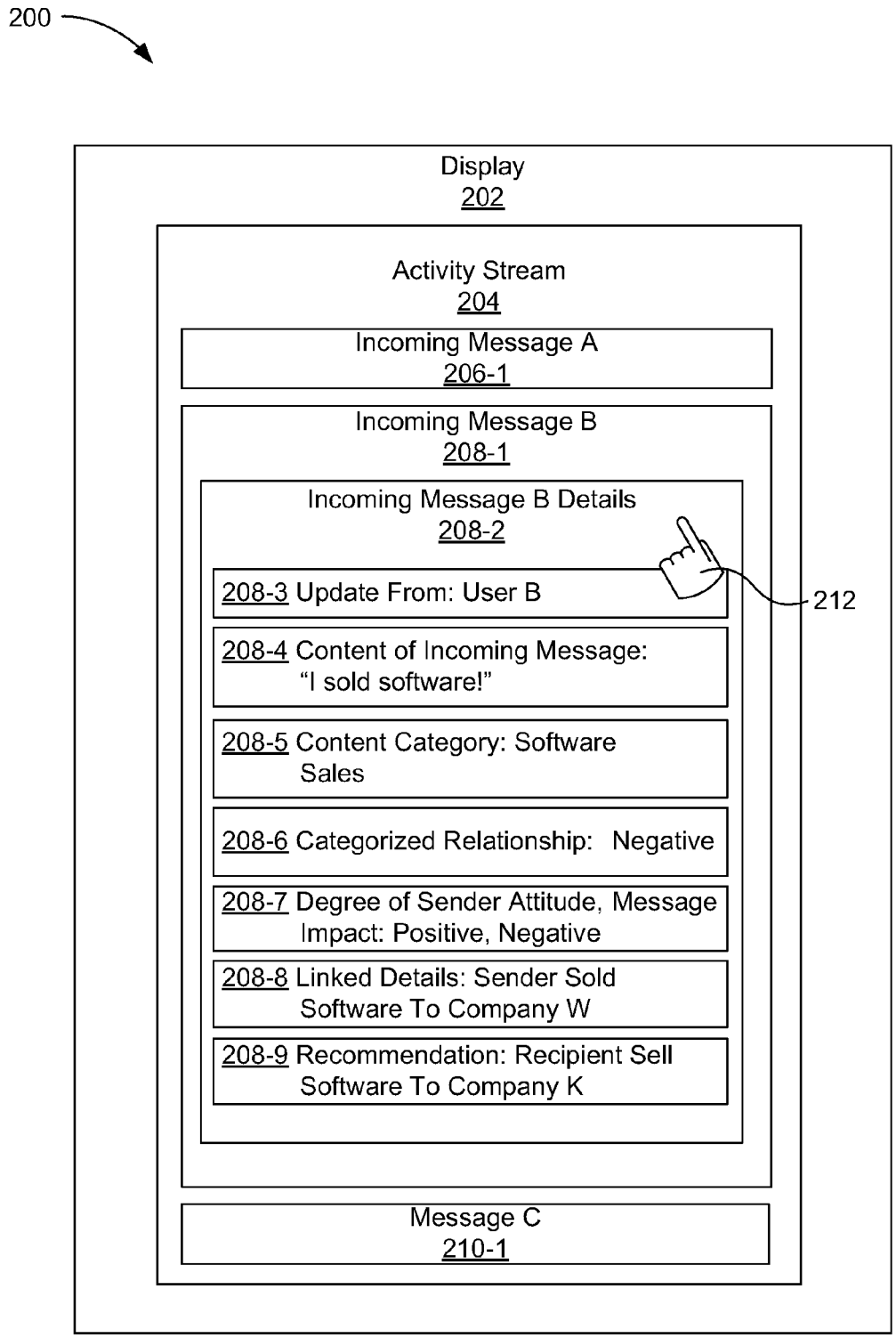
FIG. 2 is a diagram of an example for identifying content in an incoming message on a social network, according to one example of principles described herein.

FIG. 2 is a diagram of an example for identifying content in an incoming message on a social network, according to one example of principles described herein. As mentioned above, incoming messages are displayed in an activity stream in a display. In one example, an identification system filters incoming messages in an activity stream to allow the recipient to pursue counter measures to counteract the impact of the incoming message. In another example, the identification system displays all incoming messages in the activity stream.

Turning specifically to FIG. 2, a display (202) is used to display an activity stream (204) from a social network web based application. In one example, the activity stream (204) includes a number of incoming messages to be displayed. In this example, the activity stream (204) includes incoming message A (206-1), incoming message B (208-1), and incoming message C (210-1). Although, in this example, the activity stream (204) includes three incoming messages, the activity stream (204) may include any appropriate number of incoming messages.

As mentioned above, an identification system categorizes a sender-recipient relationship of an incoming message in an activity stream in a display. The identification system then categorizes a content of the incoming message and determines a degree of the sender attitude towards the incoming message. Further, the identification system generates a recommendation based on the incoming message. In one example, the recommendation is displayed in an activity stream (204). Further, when the recipient selects an incoming message using a cursor (212), additional details for the incoming message is displayed. For example, the recipient selects incoming message B (208-1) using a cursor (212). As a result, incoming message B details (208-2) are displayed. In this example, incoming message B details (208-2) may include an update from detail (208-3). The update from detail (208-3) indicates who sent incoming message B (208-1). In this example the incoming message B (208-1) was sent from the sender.

Further, the incoming message B details (208-2) may include the content of incoming message details (208-4). The content of incoming message details (208-4) displays the content of the incoming message. In this example, the content of incoming message B details (208-4) is the sender stating "I sold software!"

Still further, the incoming message B details (208-2) may include a content category details (208-5). The content category details (208-5) display the topic of the content of incoming message B details (208-4). In this example, the content category detail (208-5) is software sales.

In keeping with the given example, the incoming message B details (208-2) may include a sender-recipient relationship detail (208-6). The sender-recipient relationship detail (208-6) displays the relationship of the sender with the recipient. In this example, the sender-recipient relationship detail (208-6) is negative because recipient and sender are competitors in software sales. Alternatively, if recipient and sender were partners in software sales, the sender-recipient relationship detail (208-6) would be positive.

Further, the incoming message B details (208-2) may include a degree of sender attitude and message impact detail (208-7) on the recipient. The degree of sender attitude and message impact detail (208-7) displays whether the content of an incoming message is positive or negative. Further, depending on the sender-recipient relationship, the message impact may be positive or negative for the recipient. In this example, sender selling software is a positive degree of sender attitude for the sender. As mentioned above, the recipient and the sender are competitors in software sales. As a result, the message impact for the recipient is negative.

The incoming message B details (208-2) may include linked details (208-8). The linked details (208-8) display details of the content of the incoming message. For example, the linked details (208-8) may include details about a sales transaction. In this example, the linked details (208-8) display the name of the company that bought the software from the sender. As a result, the linked details state "Sender sold software to company W."

The incoming message B details (208-2) may include a recommendation detail (208-9). The recommendation detail (208-9) displays a recommendation for the recipient to pursue to counteract the impact of the incoming message. In this example, the recipient recommendation states, "Recipient sell software to company K."

While the above examples include a recommendation for sales, a recommendation may include recommendations for any appropriate content of an incoming message. For example, a recommendation for content of an incoming message may include a recommendation for trading stocks. In another example, a recommendation for content of an incoming message may include a recommendation for buying products.

Figure 3:
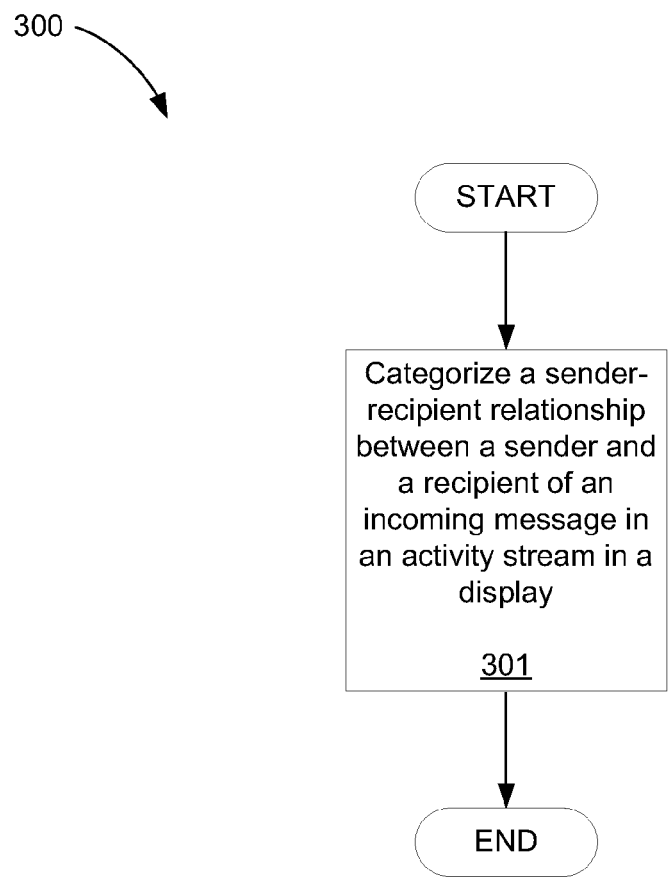
FIG. 3 is a flowchart of an example of a method for identifying content in an incoming message on a social network, according to one example of principles described herein.

FIG. 3 is a flowchart of an example of a method (300) for identifying content in an incoming message on a social network, according to one example of principles described herein. The method (300) includes categorizing (301) a sender-recipient relationship between a sender and a recipient of an incoming message in an activity stream in a display.

Turning specifically to FIG. 3, categorizing (301) a sender-recipient relationship between a sender and a recipient of an incoming message in an activity stream in a display may include a recipient manually entering the sender-recipient relationship into a field provided by the social network. For example, the recipient can manually input the sender-recipient relationship that the recipient has with the sender in a field box associated with the sender. In this example, the identification system (FIG. 1, 108) can present a list of potential relationship categories from which the recipient can select an appropriate category that describes the sender-recipient relationship. The list of categories may include categories such as business categories, education categories, employment categories, family categories, friend categories, sports categories, other types of categories, or combinations thereof. In some examples, the recipient can select categories to describe multiple sender-recipient relationships that the recipient has with the sender. The sender-recipient relationship may be a positive relationship or a negative relationship. In keeping with the given example, the recipient can categorize a positive relationship for business and education relationships with the sender. However, the recipient and sender are competitors in employment, such as software sales. As a result, the recipient can categorize a negative relationship for the sender's employment. Thus, multiple relationships can be categorized between the recipient and the sender.

As mentioned above, an incoming message in an activity stream displays the sender-recipient relationship in a display. As mentioned above, an incoming message from the sender is displayed on the recipient's activity stream via a display. As mentioned above, based on the content of the incoming message, the categorized sender-recipient relationship is displayed on the recipient's activity stream in the display.

While the above examples include a recipient categorizing relationship single sender-recipient relationship, the recipient may categorize the sender-recipient relationship with other senders as well. Further, a list of relationship categories may include any appropriate relationship category to allow the recipient to characterize another sender-recipient relationship with another sender. In some examples, the recipient has an option to generate customized relationship categories that a better suited for the sender-recipient relationship that the standard relationship categories initially provided.

While the above example includes a list of relationship categories presented to a recipient, any appropriate mechanism for categorizing the sender-recipient relationship may be used. For example, the identification system (FIG. 1, 108) may use analytics such as data text mining to extract relevant information from a recipient to categorize the sender-recipient relationship. In this example, the relevant information may be extracted from a recipient's post, a recipient's profile, a recipient's comments, a recipient's likes, other data sources associated with the recipient, or combinations thereof.

Figure 4:
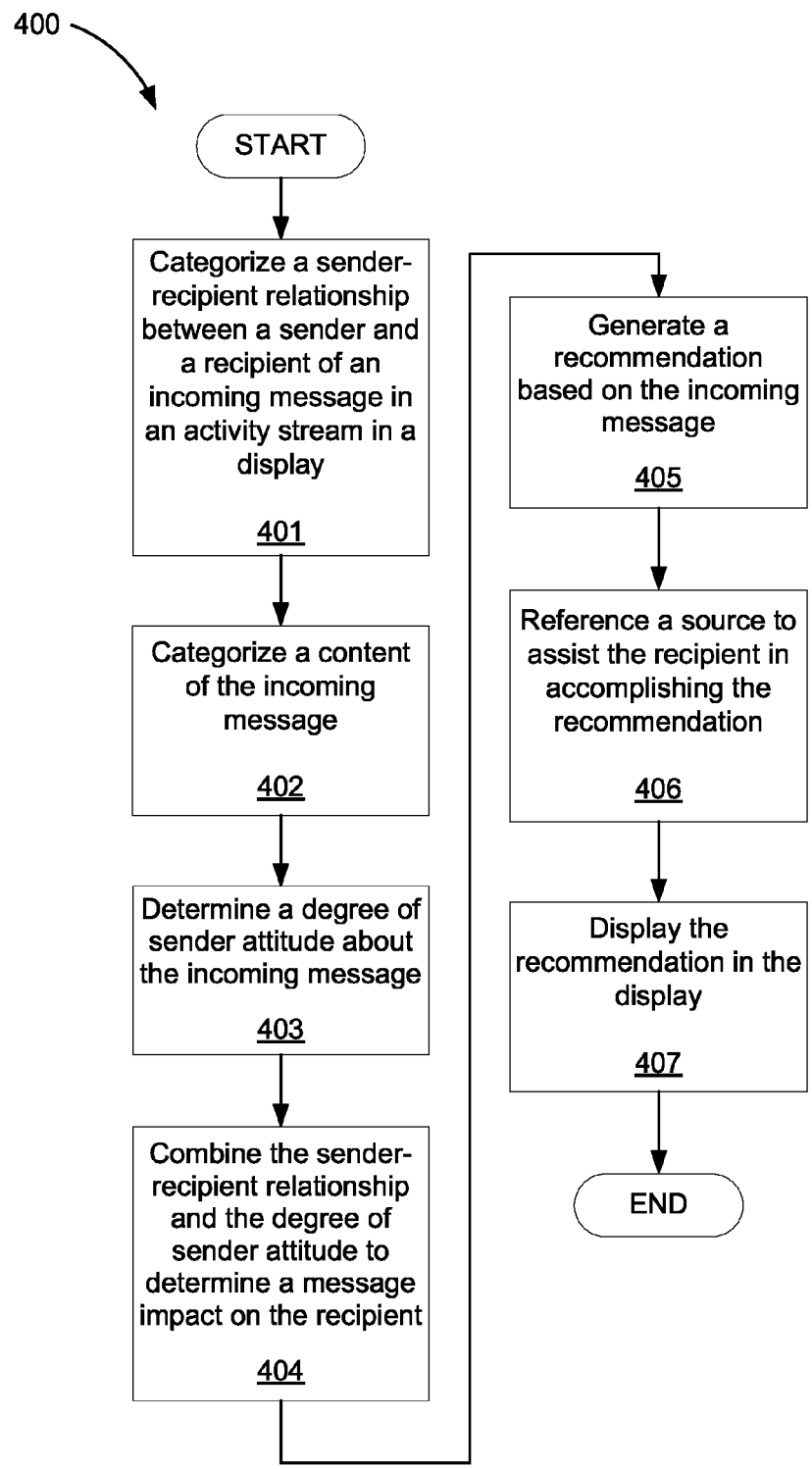
FIG. 4 is a flowchart of an example of a method for identifying content in an incoming message on a social network, according to one example of principles described herein.

FIG. 4 is a flowchart of an example of a method (400) for identifying content in an incoming message on a social network, according to one example of principles described herein. The method (400) includes categorizing (401) a sender-recipient relationship between a sender and a recipient of an incoming message in an activity stream in a display, categorizing (402) a content of the incoming message, determining (403) a degree of sender attitude of the incoming message, combining (404) the sender-recipient relationship and the degree of the sender attitude to determine a message impact on a recipient, generating (405) a recommendation based on the incoming message, referencing (406) a source to assist the recipient in accomplishing the recommendation, and displaying (407) the recommendation in the display.

As mentioned above, the method includes categorizing (402) a content of the incoming message. In one example, categorizing the content of the incoming message includes using analytics, such as poll backend analytics, data text mining, other analytics to determine the topic of the content of the incoming message, or combinations thereof. For example, if the recipient receives an incoming message from the sender that states "I sold software," analytics can be performed on the incoming message to determine the appropriate content category for the message. In this example, the content of the incoming message may be categorized as software sales.

In another example, if the recipient receives an incoming message from sender that states "I sold one of my favorite guitars to my best friend. He got a steal of a deal," the analytics may categorize the incoming message's content as guitar sales.

While the above examples include categorizing the content of the incoming message with single categories, the content of the incoming message may be categorized into multiple categories. For example, if the recipient receives an incoming message from sender that states "Today was a great day. I sold software and I sold one of my favorite guitars to my best friend," the content of the incoming message may be categorized as both software sales and guitar sales.

The method further includes determining (403) a degree of sender attitude about the incoming message. In one example, the degree of sender attitude may span an attitude continuum with various discrete degrees such as very negative, negative, somewhat negative, neutral, somewhat positive, positive, very positive, another degree, or combinations thereof. In another example, the degree of sender attitude may be either negative or positive. In keeping with the given example, the recipient receives an incoming message from the sender that states "I sold one of my favorite guitars to my best friend. He got a steal of a deal." In this example, the recipient and the sender are partners in guitar sales and have a positive sender-recipient relationship with respect to guitar sales. Analytics is performed on the incoming message to determine the degree of sender's attitude towards the incoming message. In this example, sender selling a guitar to his best friend indicates the degree of sender attitude is positive.

In another example, the recipient receives an incoming message from the sender that states "I didn't sell any software today." In this example, the recipient and the sender are competitors in software sales and have a negative sender-recipient relationship with respect to software sales. Analytics is performed on the incoming message to determine the degree of the sender's attitude towards the incoming message. In this example, the sender not selling software indicates the degree of sender attitude is negative.

While the above examples include a positive degree of sender attitude or a negative degree of sender attitude, a degree of sender attitude may be expressed as a range of numbers. In this example, the range of numbers may be from −10 to +10 where −10 represents a very negative degree of sender attitude and +10 represents a very positive degree of sender attitude.

As mentioned above, the method includes combining (404) the sender-recipient relationship and the degree of the sender attitude to determine a message impact on the recipient. As mentioned above, the recipient categorizes the sender-recipient relationship as a negative relationship with respect to software sales. For example, the recipient can receive an incoming message from the sender that states "I sold software." As mentioned above, the sender selling software is a positive degree of attitude for the sender. Since recipient and sender are competitors in software, the message impact on the recipient is negative. Alternatively, the recipient receives an incoming message from the sender that states "I didn't sell software today." As mentioned above, the sender not selling software is a negative degree of attitude for sender. Since recipient and sender are competitors in software sales, the message impact on recipient is positive.

In another example, recipient categorizes the sender-recipient relationship as a positive relationship with respect to guitar sales. In keeping with the given example, the recipient receives an incoming message from the sender that states "I sold one of my favorite guitars to my best friend. He got a steal of a deal." As mentioned above, the sender selling a guitar is a positive degree of attitude for the sender. Since the recipient and the sender are partners in guitars, the message impact on the recipient is positive.

The method further includes generating (405) a recommendation based on the incoming message. In keeping with the given example, a recommendation may be a recommendation for the recipient to sell software to company X. As a result, the recommendation for the recipient to sell software to company X allows the recipient to pursue counter measures to counteract the impact of the incoming message.

Further, the method may include referencing (406) a source to assist the recipient in accomplishing the recommendation. In one example, a recommendation for the recipient to sell software to company X may include referencing a source in a database that includes information about software that company X buys. In another example, referencing a source to assist the recipient in accomplishing the recommendation may include referencing a source in a database that includes a directory of companies that buy software.

The method also includes displaying (407) the recommendation in the display. In keeping with the given example, the recommendation for the recipient to sell software to company X is displayed in the recipient's activity stream. As mentioned above, the identification system provides an option to display additional details. In some examples, the recommendation may be one of the details displayed as part of the additional details in the display. In some example, other additional details may include update from detail, content of the incoming message detail, a content category detail, the sender-recipient relationship of the incoming message detail, a degree of sender attitude and message impact detail, linked details, other types of details, or combinations thereof.

Figure 5:
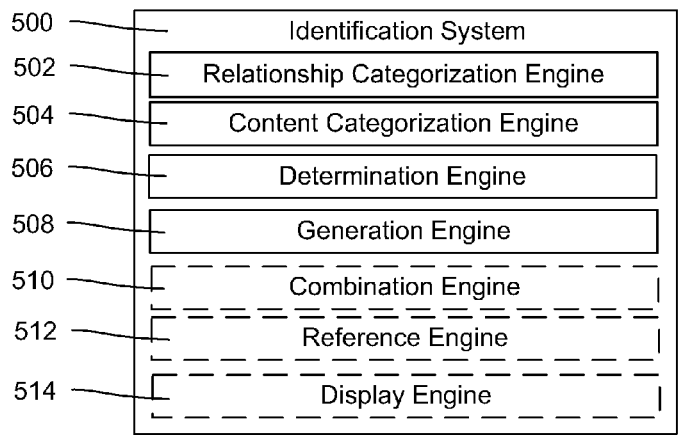
FIG. 5 is a diagram of an example of an identification system, according to principles described herein.

FIG. 5 is a diagram of an example of an identification system (500), according to the principles described herein. The identification system (500) includes a relationship categorization engine (502), a content categorization engine (504), determination engine (506), and a generation engine (508). In this example, the system (500) also includes a combination engine (510), a reference engine (512), and a display engine (514). The engines (502, 504, 506, 508, 510, 512, 514) refer to a combination of hardware and program instructions to perform a designated function. Each of the engines (502, 504, 506, 508, 510, 512, 514) may include a processor and memory. The program instructions are stored in the memory and cause the processor to execute the designated function of the engine.

The relationship categorization engine (502) categorizes a sender-recipient relationship. As mentioned above, categorizing the sender-recipient relationship may include a recipient manually entering the sender-recipient relationship into the system. Further, the recipient may categorize the sender-recipient relationship with any appropriate number of senders. Further, the relationship categorization engine (502) may present a list of relationship categories that may include any appropriate relationship category to allow the recipient to categorize the sender-recipient relationship.

The content categorization engine (504) categorizes the content of the incoming message. In one example, categorizing the content of the incoming message includes using analytics, such as data text mining, to determine the category of the content in the incoming message. For example, if the recipient receives an incoming message from sender that states "I sold software," the analytics is performed on the incoming message. In this example, the content of the incoming message may be categorized as software sales. As a result, the content categorization engine (504) categorizes the content of the incoming message.

The determination engine (506) determines a degree of sender attitude of the incoming message. Further, the degree of sender attitude may be identifiable as very negative, negative, somewhat negative, neutral, somewhat positive, positive, very positive, or another identification. Further, a degree of sender attitude may be expressed as a range of numbers. For example, the range of numbers may be from −10 to +10 where −10 represents a very negative degree of sender attitude and +10 represents a very positive degree of sender attitude.

The generation engine (508) generates a recommendation based on the incoming message. In one example, a recommendation may include generating a sales worksheet. In another example, a recommendation may include generating a corporate directory. Further, the recommendation allows a recipient to pursue counter measures to counteract the content of the incoming message.

The combination engine (510) combines the sender-recipient relationship and the degree of the sender attitude to determine a message impact on the recipient. Further, the message impact on the recipient may be very negative, negative, somewhat negative, neutral, somewhat positive, positive, very positive, or other degree. Further, a message impact on the recipient may be expressed as a range of numbers.

The reference engine (512) references a source to assist a recipient in accomplishing the recommendation. In one example, a recommendation for the recipient to sell software to company X may include referencing a database that includes information about software that company X buys. In another example, referencing a source to assist the recipient in accomplishing the recommendation may include referencing a database that includes a directory of companies that buy software.

The display engine (514) displays the recommendation in the display. In one example, the display engine (514) provides an option to display additional details. As mentioned above, additional details may include update from details, content of the incoming message details, a content category details, a sender-recipient relationship details, a degree of sender attitude and message impact details, linked details, other types of details, or combinations thereof.

Figure 6:
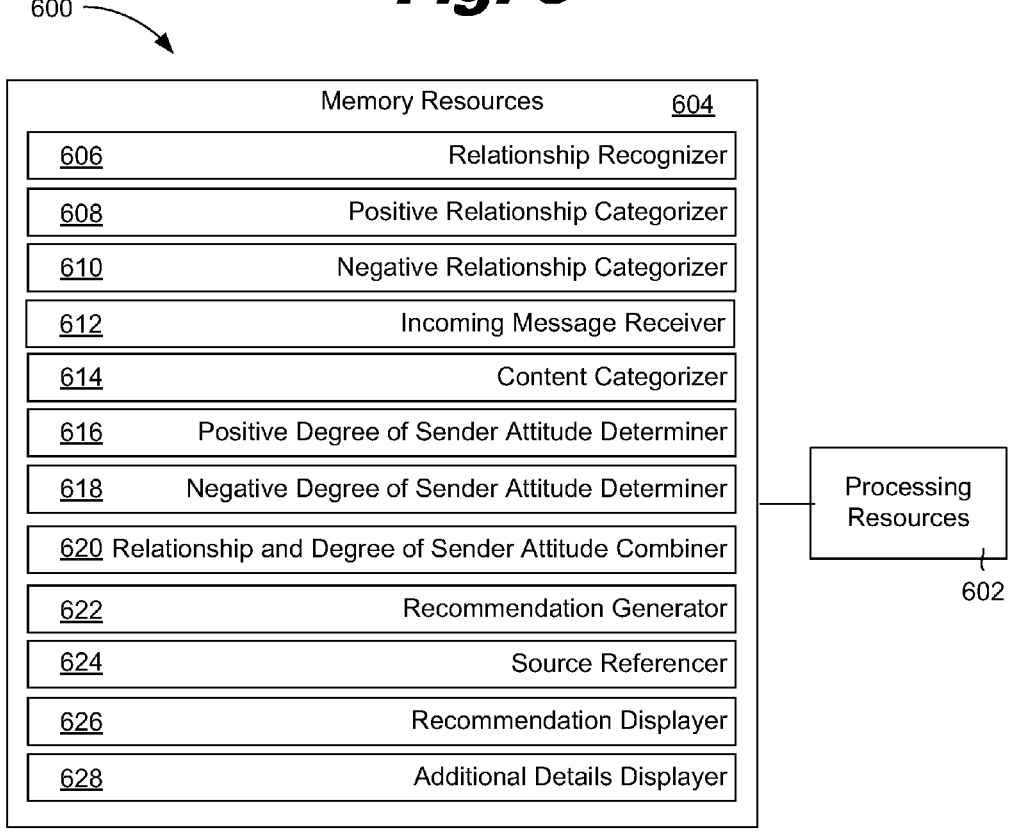
FIG. 6 is a diagram of an example of an identification system, according to principles described herein.

FIG. 6 is a diagram of an example of an identification system (600), according to principles described herein. In this example, the identification system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the identification system (600). The programmed instructions shown stored in the memory resources (604) include a relationship recognizer (606), a positive relationship categorizer (608), a negative relationship categorizer (610), an incoming message receiver (612), a content categorizer (614), a positive degree of sender attitude determiner (616), a negative degree of sender attitude determiner (618), a relationship and degree of sender attitude combiner (620), a recommendation generator (622), a source reference (624), a recommendation displayer (626), and an additional details displayer (628).

The memory resources (604) include a computer readable storage medium that contains computer readable program code to cause tasks to be executed by the processing resources (602). The computer readable storage medium may be a tangible storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The relationship recognizer (606) represents programmed instructions that, when executed, cause the processing resources (602) to recognize the existence of a sender-recipient relationship of the incoming message. The positive relationship categorizer (608) represents programmed instructions that, when executed, cause the processing resources (602) to categorize the sender-recipient relationship as a positive relationship. The negative relationship categorizer (610) represents programmed instructions that, when executed, cause the processing resources (602) to categorize the sender-recipient relationship as a negative relationship. The incoming message receiver (612) represents programmed instructions that, when executed, cause the processing resources (602) to receive the incoming message. The content categorizer (614) represents programmed instructions that, when executed, cause the processing resources (602) to categorize the content of the incoming message. The positive degree of sender attitude determiner (616) represents programmed instructions that, when executed, cause the processing resources (602) to determine a positive degree of sender attitude. The negative degree of sender attitude determiner (618) represents programmed instructions that, when executed, cause the processing resources (602) to determine a negative degree of sender attitude.

The relationship and degree of sender attitude combiner (620) represents programmed instructions that, when executed, cause the processing resources (602) to combine the sender-recipient relationship and degree of sender attitude to determine a message impact on a recipient. The recommendation generator (622) represents programmed instructions that, when executed, cause the processing resources (602) to generate a recommendation based on the incoming message. The source reference (624) represents programmed instructions that, when executed, cause the processing resources (602) to reference a sourced to assist the recipient in accomplishing the recommendation. The recommendation displayer (626) represents programmed instructions that, when executed, cause the processing resources (602) to display the recommendation. The additional details displayer (628) represents programmed instructions that, when executed, cause the processing resources (602) to display additional details with the incoming message.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, the identification system (600) may be implemented on a user device, on a server, on a collection of servers, or combinations thereof.

The identification system (600) of FIG. 6 may be part of a general purpose computer. However, in alternative examples, the identification system (600) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method for identifying content in an incoming message on a social network, comprising:
   categorizing a sender-recipient relationship between a sender and a recipient of the incoming message in an activity stream in a display;
   categorizing a content of said incoming message;
   determining a degree of sender attitude about the incoming message;
   determining an impact of the incoming message on the recipient based on a combination of the sender-recipient relationship, content of the incoming message and degree of sender attitude about the incoming message; and
   generating a recommendation for the recipient based on said incoming message and determined impact of the incoming message on the recipient wherein said recommendation is a recommendation as to how to the recipient can compete with the sender.

2. The method of claim 1, wherein categorizing said sender-recipient relationship with said recipient of said incoming message in said activity stream includes categorizing multiple sender-recipient relationship relationships between said sender and said recipient.

3. The method of claim 1, wherein generating said recommendation based on said incoming message includes displaying said recommendation in said display.

4. The method of claim 1, further comprising determining a plurality of sender-recipient relationships.

5. The method of claim 4, further comprising selecting a relevant sender-recipient relationship, from the plurality of relationships, based on the content of the incoming message, where the relevant sender-recipient relationship is then used as a basis for determining the impact of the incoming message on the recipient.

* * * * *